United States Patent [19]

Harmon et al.

[11] 4,155,040
[45] May 15, 1979

[54] FREQUENCY PROGRAMMABLE RF COMMUNICATIONS

[75] Inventors: James V. Harmon; Garreth J. Kavlie, both of Cedar Rapids; Steven R. Ackerman, Marion, all of Iowa

[73] Assignee: Rockwell International Corporation, El Segundo, Calif.

[21] Appl. No.: 819,527

[22] Filed: Jul. 27, 1977

[51] Int. Cl.² .............................................. H04B 7/02
[52] U.S. Cl. ........................................ 325/25; 325/63; 325/470; 343/177
[58] Field of Search ................... 325/15, 17, 25, 53, 325/54, 55, 63, 470; 343/175, 177, 100 CS; 179/15 BZ, 2 E

[56] References Cited
U.S. PATENT DOCUMENTS

| | | | |
|---|---|---|---|
| 3,428,899 | 2/1969 | Sekimoto | 343/175 X |
| 3,535,636 | 10/1970 | Muilwijk | 325/55 X |
| 3,739,102 | 6/1973 | Leonard | 325/55 X |

Primary Examiner—Benedict V. Safourek
Attorney, Agent, or Firm—Howard R. Greenberg; H. Fredrick Hamann

[57] ABSTRACT

An RF communications system assures selection of the optimum frequency for establishing a communications path between two stations by employing scanning transceivers which may be operated on a plurality of channels having programmed frequencies wherein the programmed frequencies in one transceiver may be automatically changed from another transceiver after establishing a communications path over one of the channels and, when calling another transceiver, the calling transceiver automatically reverts to the same channel last used for communications contact with the called transceiver.

17 Claims, 3 Drawing Figures

FREQUENCY PROGRAMMABLE RF COMMUNICATIONS

BACKGROUND OF THE INVENTION

The subject invention pertains generally to RF communications and in particular to RF communications employing scanning transceivers.

As is well known, RF communications is fraught with the problem of establishing a reliable and error-free communications path through the atmosphere between the communicating parties. For example, it is well-known that the integrity of HF signals (2-30 MHz) is particularly susceptible to atmospheric vagaries dependent on environmental conditions such as weather, sun spot activity, time of day, etc., as well as distance. Despite this shortcoming, HF communications is extensively used for maritime and avionics communications because it is not restricted to line of sight communications paths as are higher frequencies. To combat the problem of establishing a reliable communication path, various approaches have been used such as employing a plurality of receivers, each one being dedicated to a particular frequency, so that if a calling party cannot establish communications contact on one frequency, he can attempt to do so on another frequency. As pointed out in a paper entitled "Scan-Lock Control of Digitally Synthesized Receivers" by William Nations and Kenneth Kerwin presented at a Radio Technical Commission for Maritime Services Symposium on Apr. 26-28, 1976, the unattractiveness of such an approach is evident because of the cost of the multiplicity of receivers and the increased exposure to equipment failure, particularly when there are a number of coast stations to be monitored. This paper proposes a solution to the problem which entails the use of a scanning receiver which monitors a plurality of frequency channels and then locks into any channel over which a communications signal is directed to that receiver (using an encoded address identifying the receiver commonly referred to as Selcal for selective calling).

The foregoing approach requires the use of frequencies settled upon in advance by the communicating parties. Consequently, it does not consider the optimization of frequency selection on a dynamic or automatic basis to permit the continual updating of frequency channel assignments to compensate for changing conditions. Nor does it address minimizing the effort required by a human operator to establish a reliable communications channel in various situations which can be of crucial importance. For example, in a warfare scenario, a helicopter pilot who may be performing ground surveillance at an extremely low altitude must focus his attention on the terrain so as to avoid impact with tall objects, such as trees. In such a situation, the pilot cannot afford the luxury of looking up tables or manipulating radio controls in order to establish communications contact with another helicopter or with a ground station when initiating or receiving a call. He may require an RF communications path quickly and reliably but without any distracting exercises which would interfere with aircraft operation. Such a a situation exemplifies the desirability of automatically and dynamically establishing optimum RF communications frequencies so as to afford hands-off operation of the transceiver.

With the foregoing in mind, it is a primary object of the present invention to provide new and improved RF communications which permits the optimum frequency for establishing a communication path to be selected automatically and dynamically in a transceiver without intervention by the operator of the transceiver.

It is a further object of the present invention to provide such RF communications through the use of plurality of frequency channels wherein the frequencies assigned to the various channels in one transceiver can be automatically reprogrammed remotely from another transceiver.

It is still another object of the present invention to provide such RF communications wherein upon initiating a call to another transceiver, a calling transceiver automatically reverts to the same channel last used to establish communications contact with the called transceiver.

The foregoing objects as well as others, and the means by which they are achieved through the present invention may best be appreciated by referring to the Detailed Description of the Invention which follows hereinafter together with the appended drawings.

BRIEF DESCRIPTION OF THE INVENTION

In accordance with the foregoing objects, the invention herein is directed to an RF communications system which employs scanning transceivers that may be operated on a plurality of channels with each channel being programmed for a given frequency. In addition to means for interrupting the scan in response to a control signal received from another transceiver over one of the programmed channels, each transceiver includes means for reprogramming any frequency in response to an ensuing control data signal from the other transceiver. Thus, a transceiver may be automatically and dynamically changed with respect to the scanning frequencies it is to monitor without any intervention by the transceiver operator. Additional means are provided in each transceiver for storing the communications channel over which communications contact is established with another transceiver so that when another communications path is to be established therebetween the former automatically reverts to the last channel over which successful contact was made.

To further enhance the automatic operation and utility of the transceiver, additional features include automatic message acknowledgment and audio output muting to avoid subjecting the operator to the noise generated in the absence of any communications signal while the transceiver is in a scanning mode.

DETAILED DESCRIPTION OF THE INVENTION

Figure 1:
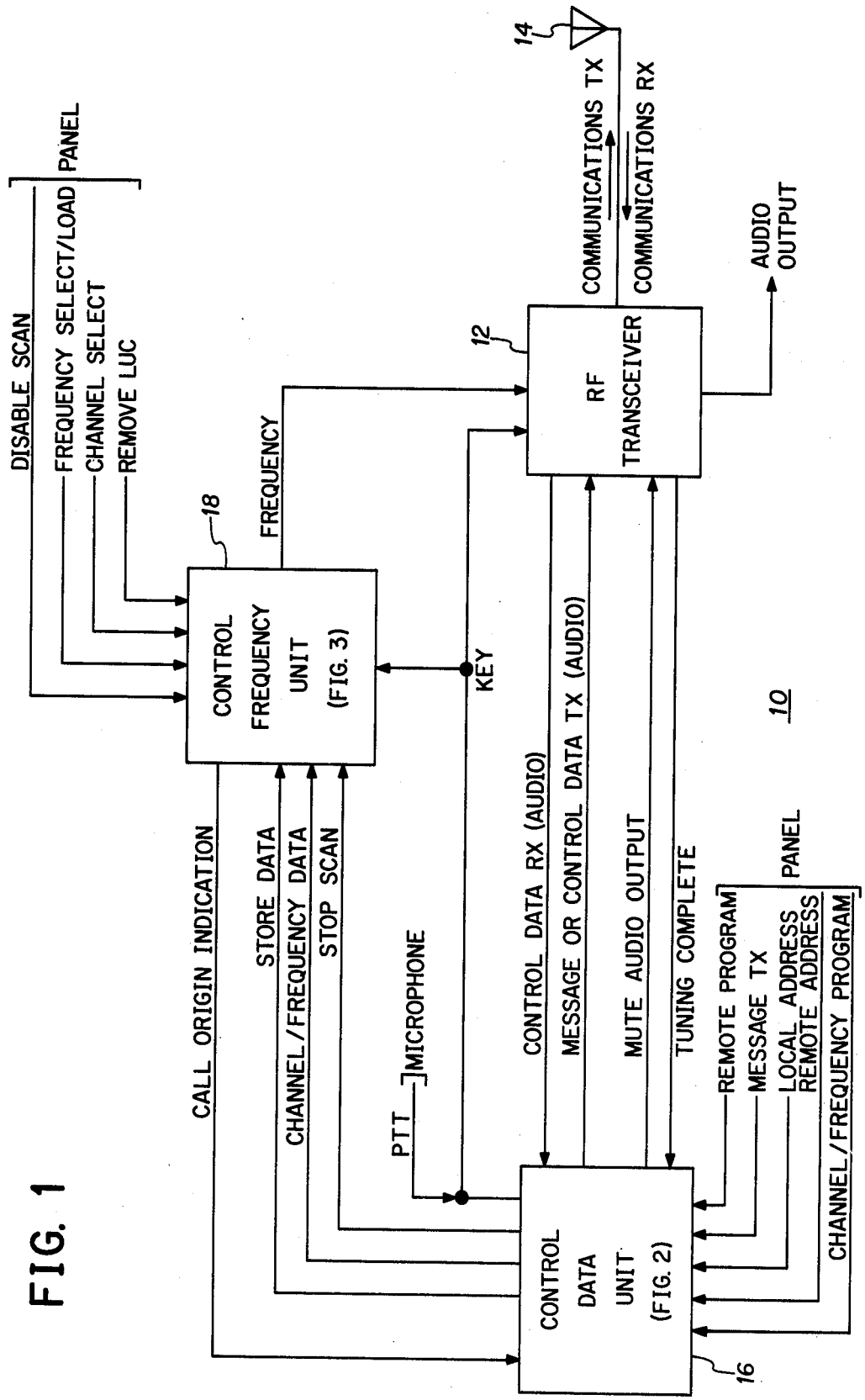
FIG. 1 is a block diagram of the transceiver unit depicting all of the signal paths helpful to an understanding of the invention.

As shown in FIG. 1, the RF transceiver unit or station of the invention designated generally by the numeral 10 comprises an RF transceiver 12 for transmitting and receiving RF communications signals TX and RX, respectively, via an antenna 14. The communications signals may be for either voice or data which constitutes the actual message to be communicated or simply control data effectuating control of the transceiver unit 10. The transceiver 12 will not be described in detal since as will be appreciated hereinafter there are many commercial ones readily available which afford the requisite automatic tuning and signal structure such as the Collins 718U family of radios which may be employed in the practice of the invention.

The audio output for any received message RX (voice or data) is taken directly from the transceiver 12 for processing in a normal manner, while the received control data RX while still in an audio form is applied to a control data unit 16 whose function as will be detailed hereinafter is to detect the data for effectuating control functions in its associated transceiver unit 10 and generate control data TX for transmission to other units 10 via its associated transceiver 12 as well as to control the passage of communications messages to be transmitted. As will be appreciated, although many types of control data signals may be employed to expand the versatility and convenience of the invention herein, only three are necessary to an understanding of how it operates, namely one for establishing an initial communications contact, one for acknowledgment purposes, and one for reprogramming the frequency that is assigned to a particular channel.

The frequency at which the transceiver 12 operates is controlled by the output of a frequency control unit 18 which is responsive to the data signals received from either the control data unit 16 or manually generated at the transceiver unit 10 equipment panel by a human operator. In the absence of any communications contact between the transceiver 12 and another transceiver, the transceiver unit 10 would normally be in the scanning mode in order to monitor a plurality of channels over which it can recognize communications thereto. Each channel has an assigned frequency preferably identified with a digital code supplied by the frequency unit 18 to the transceiver 12 to cause its receiver to automatically tune to that frequency. Scanning is accomplished by repetitively and suquentially changing the code at the output of control unit 18 until its operation is interrupted upon a stop scan command signal from the output of data unit 16. During the scanning operation, control unit 18 pauses at each channel a sufficient amount of time for the receiver of transceiver 12 to tune to the designated frequency and to listen for a control data signal initiating a communications contact (which would normally be the addressed Selcal code identifying a called station by its unique address briefly mentioned under the Background of the Invention). The pesence of such a signal interrupts the scanning operation while its absence allows the scanning operation to continue. As will be explained shortly, the scanning operation will also be interrupted any time that a call is initiated by the transceiver unit 10 itself upon the generation of a momentary key signal in response to a push-to-talk (PTT) input to transceiver unit 10 normally generated upon depression of the button on the operator microphone (not shown) for changing the transceiver 12 operation to a transmit mode.

The establishment of a key (automatically in response to a stop scan signal when the transceiver unit 10 receives a call) permits the transmitter portion of transceiver 12 to tune to the frequency designated at the output of control unit 18. Upon completion of the transmitter tuning, a tuning complete signal is applied to data unit 16 to initiate a preset period of time to permit a transmission TX from the transceiver unit 10 to another unit. When the other unit initiates the contact, the transmission from transceiver 10 constitutes a data acknowledgement signal to let the other unit know a successful contact was made. When the transceiver unit 10 intitiates the call itself, the transmission period is intended for establishing the initial contact with the called unit. When initiating a call, transceiver unit 10 will receive an acknowledgment from the called unit upon a successful contact just as it transmits such an acknowledgment when it receives a call. Address signals identifying the called and calling stations are entered in the data unit 16 from the panel by the operator.

Having made and confirmed the establishment of a communications path between two transceiver units, any desired communications message can then be transmitted therebetween as in a normal manner with the transmitted message TX being routed through the data unit 16. In the absence of a transmission by a transceiver unit 10 (as denoted by the absence of a key) followed by the passage of a preset period of time, scanning by the frequency unit 18 is automatically resumed.

The frequencies programmed for the available channels are stored in control unit 18 and may be entered thereinto in either of two ways. They may be entered manually from the transceiver unit 10 panel by the operator by selecting the channel to be changes and then reprogramming by loading in the desired frequency to be assigned thereto, or automatically without the intervention of the operator by control data signals received from the data unit 16 specifying the channel to be changed and its frequency and a command signal for storing the data. The latter alternative is accomplished in response to a control data signal received from another transceiver unit after first establishing initial contact in the manner previously described. The control data signal identifies the channel to be changed and its frequency, the information being transmitted over the channel in the same manner as any message would in response to a remote program panel input. Thereafter, the data unit 16 in the reprogrammed transceiver unit 10 transmits an acknowledgment data signal to the other transceiver unit notifying it that the change was indeed made.

In initiating a call to another transceiver unit, it would be logical for the operator to select the channel last used for communicating with that unit based on the previous successful contact. The operator need not manually select that channel since the frequency unit 18 automatically reverts to that channel any time that the transceiver unit 10 initiates a call while in the scanning mode. This is accomplished by first entering the remote address information into unit 16 (identifying the transceiver unit to be called; the local address for the calling unit is specified as well) and then keying the unit 10 through the PTT signal. All channels over which communications contacts were established with other units are automatically stored in frequency unit 18 for future retrieval. This is done to insure that the programmed frequencies are dynamically changed for optimum selection, the frequency information being stored and automatically updated any time that a communication path is established with another unit irrespective of which unit initiated the call. This feature can be defeated by the manual operator if desired from the front panel of the equipment. In this connection, as will be appreciated hereinafter, for acknowledgment purposes, a call origin indication signal is applied to the data unit 16 from the frequency unit 18 to identify whether the transceiver unit 10 is receiving or initiating a call. The call origin indication signal is necessary in order to assure that the frequency unit 18 tunes the transceiver 12 to the appropriate frequency, that commanded by another unit when receiving a call or the last used channel (LUC) when initiating a call.

Should the operator which to select the channel for initiating a call rather than relying on the last used channel feature, he can do so by disabling the scan control and selecting the channel from the front panel of the equipment via the frequency unit 18 and thereafter initiating the call by operating his PTT key. This allows him to assume manual control whenever the conditions warrant.

Figure 2:
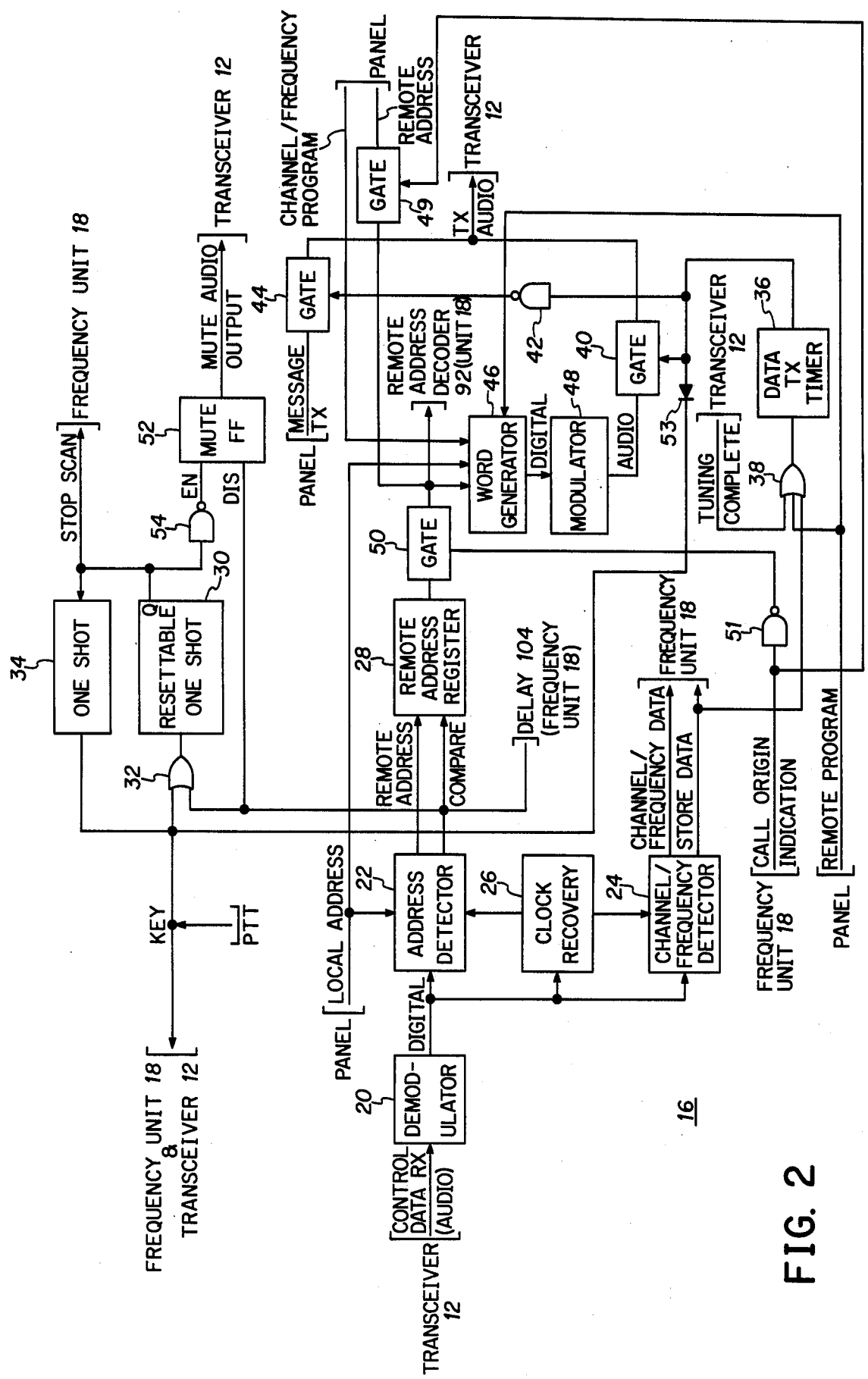
FIG. 2 is a detailed diagram of the control data unit of the transceiver unit for receiving and transmitting control data signals necessary to the operation of the transceiver unit.

As shown in FIG. 2, the control data unit 16 comprises a demodulator 20 for receiving the control data RX signal via the transceiver 12 in an audio form and converting it to a digital form at its output, a function performed by many readily available commercial modems. The output of demodulator 20 is applied to both an address detector 22 and a channel/frequency detector 24. Althought the invention is not restricted to any particular data encoding format, the use of Modulo II encoding whereby the data and clock used for timing purposes are combined into a single data stream permits a synchronzied clock to be locally generated through the use of any number of well-known clock recovery circuits 26 directly from the digital data output stream of demodulator 20. This clock is then used for timing purposes in detectors 22 and 24 for data detection (e.g. recovering the control data digital words) as well as throughout the rest of the elements which comprise the data and frequency units 16 and 18, respectively, although not shown for purposes of convenience.

For convenience and simplicity, it may be assumed that during any control data transmission, a control word containing an adequate number of bits to identify the calling and called stations by their respective addresses is repeated sufficiently to ensure its reception and detection (it being realized that other more sophisticated error and detection schemes could just as well be used). Accordingly, the address detector 22 continuously monitors the digital output of demodulator 20 for a comparison of the address in the digital word received by transceiver 12 from another unit with the address for its associated transceiver unit 10 applied thereto for that purpose as a panel input identifying it. The detection of its address (the detection of two or more identical consecutive words could be used to ensure reliability) signifies the establishment of a communications channel with some other unit which is initiating a call, producing a compare signal to enable a remote address register 28 to store the remote address contained in the digital word identifying the remote station from whence it was transmitted. The compare signal is simultaneously applied to a resettable one-shot 30 (via one input of an OR gate 32) whose Q output produces a high level stop an signal (all activating signals considered to be high level signals) that is applied to the frequency unit 18 to interrupt its scanning operation. The resettable one-shot 30 affords a predetermined time-out period whose expiration causes the Q output to return to a low level thereby terminating the stop scan signal and permitting the scanning operation of frequency unit 18 to resume. The generation of the stop scan signal causes a one-shot 34 to produce a key signal at its output which is then applied back to the transceiver 12 to enable its transmitter to tune to the channel designated by the output of frequency unit 18 upon its scan interruption in response to the control data word (the receiver is automatically tuned upon each scanning operation pause on each channel as previously mentioned).

When the transmitter is tuned, the transceiver 12 generates a tuning complete signal pulse which is applied to a data TX timer 36 of data unit 16 via one input or an OR gate 38. This results in an enable signal which is applied to a gate 40 to close it concurrently with a disable signal that is applied via an inverter 42 to another gate 44 to open it. The outputs of gates 40 and 44 are connected in common to the transmit TX audio input of transceiver 12 for providing communications to transmit to other transceiver units. The input of gate 44 is connected to receive any messages whether voice or data to be transmitted via the equipment panel while the input to gate 40 is connected to a word generator 46 via a modulator 48. One of the four inputs to the word generator 46 is the address of the associated transceiver unit 10 while another input is the remote address of another unit, obtained from the remote address register 28 via a gate 50, which initiated a call. When the unit itself initiates a call, the remote address of the called station can entered directly into the word generator 46 from the panel as shown via gate 49 which would be enabled for that purpose by virtue of the call origin indication signal. Modulator 48 performs the reverse function of demodulator 20 so as to convert digital information to audio for transmission purposes and would comprise the same modem as the latter. Whenever a scanning operation is interrupted in the absence of a key signal, the call origin indication from the frequency unit 18 is low indicating that another transceiver unit initiated the call. Upon passage through inverter 51, this signal enables gate 50 to pass the remote address corresponding to the calling station to the word generator 46. Gate 40 is enable to pass the digital output of word generator 46 via modulator 48 to the transceiver 12 for transmission to the calling unit which initiated the call as an acknowledgment for a fixed period of time such as four seconds, under the control of the data TX timer 36. The output of timer 36 is applied to generate a key via diode 53 to maintain the transceiver 12 in a transmit mode during this time. Also at this time, gate 44 is disabled from passing any communications messages to the transceiver 12 for transmission purposes. Upon the expiration of the period provided by timer 36, gate 40 is disabled and gate 44 is enabled to the pass any messages to the transceiver 12 for transmission from transceiver unit 12.

While the scanning operation is in effect, a mute flip-flop 52 receives an enable signal from the output of the resettable one-shot 30 via an inverter 54 to provide an output signal that is applied to transceiver 12 for muting its audio output, thereby sparing the operator from having to listen to the noise produced during the scanning operation. However, once the scanning operation is interrupted, indicating the establishment of a communications path and a possible voice communication thereafter, flip-flop 52 is disabled from generating the mute audio output of the same signal which initiated the stop scan signal in the first place. Thus, any voice communication received thereafter will be heard by the operator at the transceiver unit 10.

As mentioned previously, the frequencies assigned to the various channels that are stored in frequency unit 18 may be entered by the operator himself or in response to a channel/frequency control data word received from another transceiver unit. This channel/frequency word may be generated and transmitted in the same manner as that for the stop scan control data word that initially established a communications path using word generator 46 (it being realized that a second word generator could of course be used if desired to provide a different length digital word or format) and modulator 48 by initiating timer 36 via a second input to OR gate 38 designated Remote Program from the panel. This remote program signal could also be applied to word generator 46 to control a single bit for designating frequency changes to be made. Upon reception and detection in the channel/frequency detector 24, the new frequency to be assigned to the designated channel is stored in frequency unit 18 in response to a store data signal provided at the output of detector 24. The store data signal also enables an acknowledgment data signal to be transmitted back to the calling station via a third input of OR gate 38.

Figure 3:
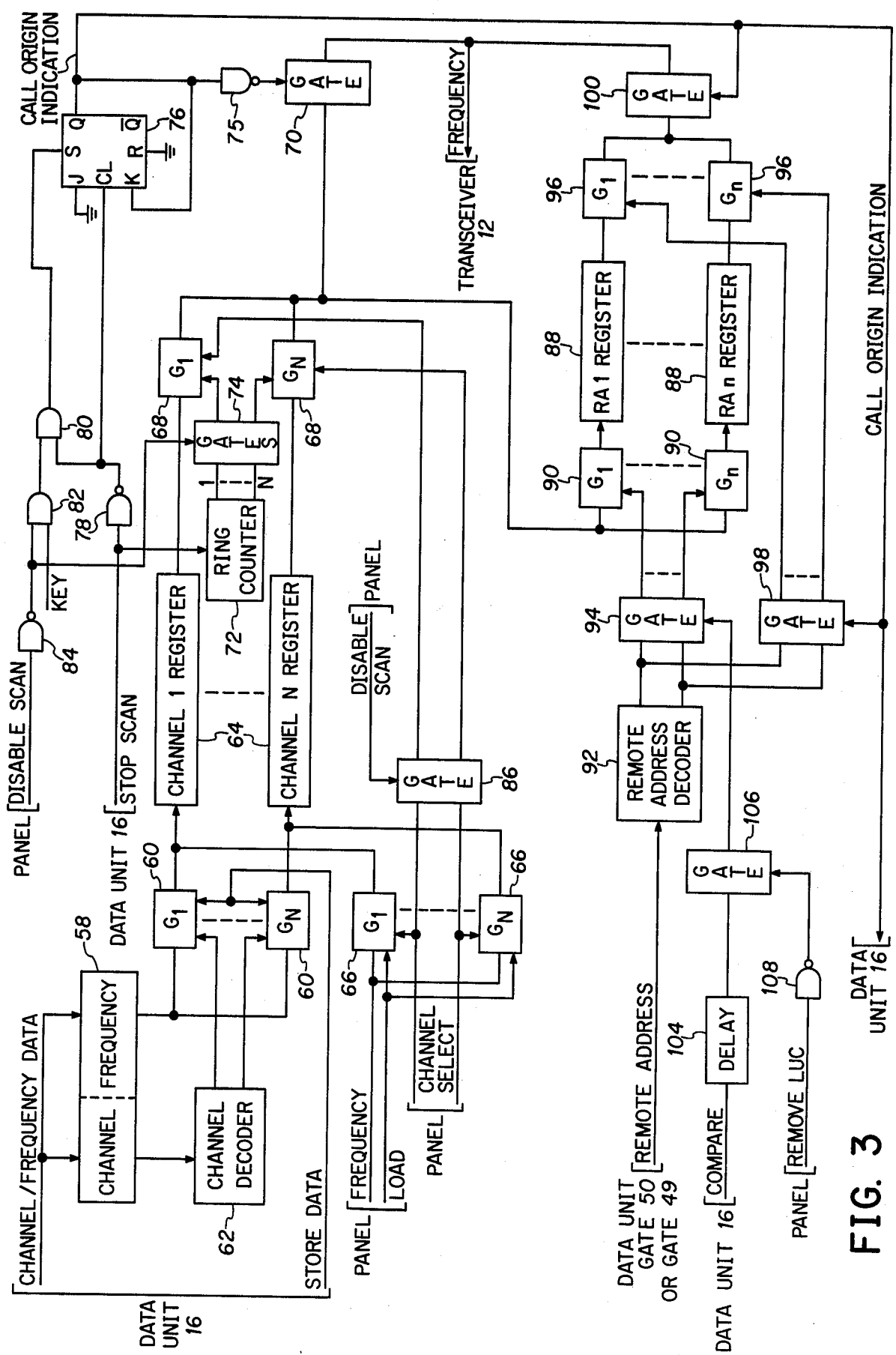
FIG. 3 is a detailed diagram of the control frequency unit which is responsive to the control data signals from the control data unit to effectuate the frequency control of the RF transceiver.

Looking at FIG. 3 which depicts the frequency unit 18, it will be seen that the designation of the channel to be changed is entered into one section of a channel/frequency register 58 while the reprogrammed frequency to be assigned thereto is entered into another section thereof (serial or parallel entry being used as desired or appropriate). The output of the frequency section of register 58 is applied in common to the input of a plurality of channel storage gates 60 ($G_1$—$G_N$) there being N such gates equal to the number of channels N to be scanned in the transceiver unit 10. The channel section output of register 58 is applied to a channel decoder 62 having N output leads, each one being connected to a different one of the channel storage gates 60. Each one of the outputs of gates 60 is connected to a different one of a plurality of channel registers 64 (1-N), there being one for each of the channels numbered accordingly for storing the frequency to which the channel is assigned. The store data signal received from the data unit 16 enables all of the gates 60 to pass the new frequency being assigned while the channel decoder 62 output selects only one of the gates 60 both enablements required coincidentally, for passing the reprogrammed frequency to the appropriate channel register 64.

The operator of the transceiver unit 10 may also enter new frequencies in the channel registers 64 through a plurality of gates 66 ($G_1$-$G_N$) whose outputs are individually connected to the registers 64 in the same fashion as those of gates 60. The desired frequency is applied to all of the inputs of gates 66 and entered into the appropriate register 64 in response to a load signal from the panel and an individual lead to one of the gates 66 which is enabled concurrently by a channel select signal from the panel.

Each channel register 64 has an output channel operate gate 68 ($G_1$-$G_N$) associated therewith whose outputs are connected in common to the input of another gate 70 whose output is in turn connected to the transceiver 12 for applying thereto the desired frequency to which it is to be tuned. The channel operate gates 68 are repetitively and sequentially enabled by individual leads at the output of an N stage ring counter 72 via a gating circuit 74 which is enabled during a scanning operation. The ring counter 72 is connected to receive the stop scan signal in response to which it immediately stops counting and continuously enables one of the channel operate gates 68 which is connected to its output lead which was activated immediately prior to the scan interruption corresponding to the desired channel.

Any time that a stop scan signal occurs prior to a key signal indicating a received call, gate 70 is enabled via inverter 75 by the call origin indication signal generated within the frequency unit 18 as previously alluded to. This signal is generated at the Q output of a J-K flip-flop 76 which is fed back as a K input. The clock input of flip-flop 76 is derived from the output of an inverter 78 whose input is the stop scan lead from the Q output of resettable one-shot 30 in the data unit 16. The output of inverter 78 is connected as an input of an AND gate 80 having a second input derived from an AND gate 82. One input of AND gate 82 is derived from the key lead while a second input is derived from the panel disable scan input via an inverter 84. Flip-flop 76 is activated upon a positive transition clock signal when not driven into a set state (Q output high) by an overriding high level signal applied to its S input by the output of AND gate 80.

The flip-flop 76 together with its input circuitry is designated to identify the origin of a call whether from or to the transceiver unit 10 by determining which signal, stop scan or key came first during a scanning operation. A stop scan signal prior to the key signal indicates a call from another unit while the reverse indicates a locally initiated call. In the absence of a clock signal, flip-flop 76 is set via its S input to render its Q output high and thereafter reset via the clock by virtue of the K input feedback path. The S input when high precludes the Q output from being low in consequence of a clock signal. During a scanning operation, it will be readily seen that the Q output of flip-flop 76 is always low. This is so since the stop scan signal which is a high cannot change to a low to resume the scan in the presence of a key signal which is considered to be a high. Thus, when scanning is resumed, the positive transition at the output of inverter 78 clocks J-K flip-flop 76 to place a low at its Q output (S input being at this time so as not to produce an override). Starting with this condition, should a stop scan signal occur first during the scanning operation, the J-K flip-flop does not change state irrespective of what happens on the key lead since the low output of inverter 78 forces the one of the inputs of AND gate 80 and thus its output and the S input of flip-flop 76 to remain low so that the flip-flop 76 cannot be set and its Q output changed to a high level. The low level Q output during the scan interruption denotes a received call. Should a key signal occur prior to a stop scan signal however, the flip-flop 76 does change state via its S input producing a high Q output which does inhibit gate 70 via inverter 75. As will be explained shortly, this permits the last used channel (LUC) feature of the invention to be invoked in response to the initiation of a call by transceiver unit 10.

Should the operator elect to choose his own channel for initiating a call rather than rely on the LUC feature, he can do so by disabling the scanning operation from the equipment panel which then defeats the call origin indication circuit via AND gate 82 through inverter 84 and disables gating circuit 74 so as to inhibit any further scanning. This same signal enables gates 86 which interconnect the individual channel select leads from the panel with individual inputs to the channel operate gates 68 permitting the desired programmed channel information to be selected.

Turning to the LUC feature now, the frequency unit 18 contains a plurality of remote address (RA) registers 88 (1-n) equal in number to that of the remote stations with which communication contact is desired. Each RA register 88 is dedicated to the storage of a frequency associated with a particular remote station. The inputs of RA registers 88 are connected to individual RA storage gates 90 ($G_1$-$G_n$) whose inputs are commonly connected to the joined outputs of channel operate gates 68. Each RA storage gate 90 is individually enabled through a lead derived from an individual output of a remote address decoder 92 via a gate circuit 94. The individual output leads of remote address decoder 92 are connected in similar fashion to individual RA operate gates 96 ($G_1$-$G_n$) via a gate circuit 98. The outputs of RA operate gates 96 are connected in common to the input of a gate 100 whose output is connected to the output of gate 70 to apply a frequency to transceiver 12 when enabled by the Q output of flip-flop 76. The input of remote address decoder 92 is connected in common to the output of gates 50 and 49 of data unit 16 to receive a remote address for decoding. Gate 49 is connected to be enabled by a high level call origin indication signal indicating a locally initiated call. Gate circuit 9 is connected to be enabled by the compare signal produced at the output of address detector 22 via a delay circuit 104 and a gate 106, the latter being continuously enabled so long as not defeated by a remove LUC signal from the equipment panel via inverter 108.

The LUC feature is implemented by first decoding the remote address of the remote station being called when the transceiver unit 10 initiates a call upon the enablement of gate 49, or the remote address of a remote station which is calling the transceiver unit 10 upon the enablement of gate 50 and decoding it via remote address decoder 92 to energize its appropriate output lead corresponding to the register 88 dedicated thereto. When the transceiver unit 10 is initiating a call, gating circuit 98 is enabled by the high level condition of the call origin indication signal so as to select one of the LUC operate gates 96 to apply the output of its associated register 88 to the transceiver 12 for controlling its frequency (remembering that gate 100 is closed at this time while gate 70 is open in response to the generation of the PTT key signal prior to the scanning interruption for the initiated call). Thus, the transceiver 12 cannot respond to the information contained in any of the channel registers 64. Should a call be received so that the scan operation is interrupted before the generation of the key, the open condition of gate 100 and closed condition of gate 70 causes the transceiver 12 to respond to one of the channel registers 64 as desired rather than one of the address registers 88. Defining the optimum frequency to be that of the last channel used to successfully establish communications contact with a remote station, the address registers 88 are updated for each new call through the gating circuit 94 when not disabled, to permit the selective enablement of one of the storage gates 90 to pass frequency information to its associated RA register 88 from the output of one of the channel registers 64 through its associated gate 68 which will likewise be enabled at that time. Gate 94 is enabled whenever a compare signal appears at the output of address detector 22 so long as gate 106 is not disabled by the presence of the remove LUC signal from the panel under the control of the operator. It is to be noted that the frequency information stored in the address registers 88 cannot be updated until a communications path is in fact established between transceiver unit 10 and a remote station. In the case when the transceiver unit 10 initiates a call this does not happen until communications contact is acknowledged from the remote station by virtue of the acknowledgment signal received therefrom, which as previously mentioned produces a compare signal at the output of address detector 22. In the case when the transceiver unit 10 receives a call, contact is verified by the compare signal arising from a comparison of the control word address with the local address. The delay circuit 104 ensures that the gate 94 is not enabled until the remote address contained in the control word is loaded into remote address register 28.

As delineated in the foregoing description, the subject invention optimizes the frequency selection for establishing an RF communications channel automatically and dynamically by affording programmability which can be made without intervention by the transceiver operator and can be performed remotely to replace unusable or questionable frequencies with efficacious ones. The last used channel feature assures a reliable communications path based on a previous successful communications path when selecting a channel and does so automatically so as to relieve the operator of much of the effort, thus effectuating hands-off control. When employed for aircraft communications, the reprogramming of the frequency channels stored in the aircraft transceivers from a ground station relieves pilots of that function. Although the invention is depicted herein with hardwired circuitry to underscore the innovative features thereof, it will be readily apparent to those skilled in the art that the invention is ideally suited for implementation with a microprocessor that is properly programmed. Also, although modulation modes were not addressed it should be readily apparent that the invention could just as well function wherein the initiation of a communications path is made with one modulation mode (AM modulation for example commonly used for Selcal transmissions) and communications messages are made with some other mode (e.g. SSB which is commonly used) by appropriately switching the transceiver 12 after contact is established. Since other departures from the presented embodiment may also be made without detracting from the scope and spirit of the invention, the foregoing Detailed Description is intended to be merely exemplary and not circumscriptive of the invention as it will now be claimed hereinbelow.

What is claimed is:

1. A frequency programmable RF communications system, comprising:

a first station including a transceiver for transmitting and receiving RF communications over a plurality of channels, each channel being programmed for a different frequency, control frequency means for storing the programmed frequencies in accordance with their respective channels and for causing said transceiver to scan said plurality of channels until said transceiver interrupted and control data means connected to the output of said transceiver for interrupting the operation of said control frequency means in response to a first control data signal received over one of the channels to establish a communications path via that channel and thereafter changing the programmed frequency for any one of the channels in response to a second control data signal received over the established communications path, and a second station for generating and transmitting said control data signals.

2. The system of claim 1 wherein said control frequency means includes means for storing the frequency of the channel last used for communications contact between said stations and for automatically selecting that frequency as a communications channel when said first station initiates a call to said second station.

3. A frequency programmable RF communications system, comprising:

at least two stations, each including a transceiver for transmitting and receiving RF communications over a plurality of channels of programmed frequencies and control frequency means having scanning means for causing its associated transceiver to scan said plurality of channels for a communications signal from the other station via one of the channels and in response thereto interrupting the scan at that channel to establish over the programmed frequency associated with the channel a communications path between the two stations, said frequency means further including means for storing the frequency of that channel beyond the duration of the communications path and for automatically selecting that frequency as a communications channel when its associated station thereafter initiates a call to said other station.

4. The system of claim 3 including more than two stations, with each station being identified by a unique address used for calling purposes as well as for automatically selecting the same frequency last used as a communications channel between two stations whenever one of the stations initiates a call to the other.

5. The system of claim 4 wherein at least one of said stations includes means for transmitting control signals over any of the channels to change the programmed frequencies in other stations and at least one of the other stations includes means responsive to said control signals.

6. A frequency programmable station for transmitting and receiving RF communications over a plurality of channels having programmed frequencies, said station being responsive to a first control signal received over one of the channels for establishing the channel as a communications path from another station, comprising:

a transceiver for transmitting and receiving the RF communications;

control frequency means for storing the programmed frequencies and for causing said transceiver to scan said plurality of channels until said transceiver scan is interrupted;

control data means connected to the output of said transceiver for interrupting the transceiver scan of said frequency means in response to the first control signal, and means within said frequency means for changing a channel to a new frequency as designated by a second signal received from the other station over the established communications path.

7. The station of claim 6 wherein said control frequency means includes means for storing the frequency of the channel last used for communications contact between said station and the other station and for automatically selecting that frequency as a communications channel when said station initiates a call to the other station.

8. A frequency programmable station, comprising:

a transceiver for transmitting and receiving RF communications over a plurality of channels having programmed frequencies and control frequency means having scanning means for causing said transceiver to scan said plurality of channels for a communications control signal from at least one station via one of the channels and in response thereto interrupting the scan at that channel for establishing a communications path with said other station via that channel, and further including means for storing the frequency of that channel beyond the duration of the communications path and automatically selecting that frequency as a communications channel when said station thereafter initiates a call to said other station.

9. The station of claim 8 including means for identifying each of the stations by a unique address used for calling purposes as well as for automatically selecting the same frequency last used as a communications channel between said station and said other station whenever said station initiates a call to said other station.

10. The station of claim 9 wherein at least one of said other stations includes means for transmitting a control frequency signal over communications channel to change a programmed frequency in said station and said station includes means responsive to said control frequency signals.

11. Frequency programmable apparatus for use with a transceiver for transmitting and receiving RF communications over a plurality of channels having programmed frequencies responsive to a first control signal received over one of the channels for establishing the channel as a communications path from another station, comprising:

control frequency means for storing the programmed frequencies and for causing the transceiver to scan said plurality of channels until said transceiver scan is interrupted;

control data means connected to the output of the transceiver for interrupting the transceiver scan at said frequency means in response to the first control signal, and means within said frequency means for changing a channel to a new frequency as designated by a second control signal received from at least one other station over the established communications path.

12. The apparatus of claim 11 wherein said control frequency means including means for storing the frequency of the channel last used for communications contact between the stations and for automatically selecting that frequency as a communications channel when said station initiates a call to the other station.

13. The apparatus of claim 11 wherein said data means includes means for muting the audio output of the transceiver whenever said control frequency means is not interrupted.

14. Frequency programmable apparatus for use with a station transceiver for transmitting and receiving RF communications over a plurality of channels having programmed frequencies, comprising:

scanning means for storing the programmed frequencies and causing the transceiver to scan said plurality of channels for a communications control signal from another station via one of the channels;

stop scan means responsive to the control signal for interrupting the transceiver scan at that channel for establishing a communications path over that channel with said other station;

storage means for storage the frequency of that channel beyond the duration of the communications path, and last used channel means for selecting that frequency as a communications channel when the station transceiver thereafter initiates a call to the other station.

15. The apparatus of claim 14 including means for identifying each of the stations by a unique address used for calling purposes as well as for selecting the same frequency last used as a communications channel between the station whenever the station transceiver initiates a call to the other station.

16. The apparatus of claim 15 wherein at least one of the other stations includes means for transmitting a control frequency signal over a communications channel to change a programmed frequency in the station transceiver and said scanning means includes means responsive to said control frequency signal.

17. The apparatus of claim 14 including means for muting the audio output of the transceiver whenever said stop scan means is not activated.

* * * * *

UNITED STATES PATENT AND TRADEMARK OFFICE
CERTIFICATE OF CORRECTION

PATENT NO. : 4,155,040                        Page 1 of 2
DATED        :     May 15, 1979
INVENTOR(S) :    James V. Harmon; Garreth J. Kavlie; Steven R. Ackerman It is certified that error appears in the above-identified patent and that said Letters Patent are hereby corrected as shown below:

Column 1, line 38, delete "into" and substitute therefor --onto--.
Column 1, line 62, after "such" delete --a--.
Column 2, line 5, after "of" insert --a--.
Column 3, line 4, after "data' insert --for--.
Column 3, line 6, delete "detal" and substitute therefor --detail--.
Column 3, line 18, after "other" insert --transceiver--.
Column 4, line 5, after "transceiver" insert --unit--.
Column 4, line 29, delete "changes" and substitute therefor --changed--.
Column 5, line 10, delete "which" and substitute therefor --wish--.
Column 5, line 60, delete "an" and substitute therefor --scan--.
Column 6, line 11, delete "or" and substitute therefor --of--.
Column 6, line 41, delete "enable" and substitute therefor --enabled--.
Column 6, line 53, delete "the" and substitute therefor --then--.
Column 8, line 24, delete "designated" and substitute therefor
       --designed--.
Column 8, line 41, after "being" insert --low--.
Column 9, line 4, delete "communication" and substitute therefor
       --communications--.
Column 9, line 24, delete "9" and substitute therefor --94--.

UNITED STATES PATENT AND TRADEMARK OFFICE
CERTIFICATE OF CORRECTION

Page 2 of 2

PATENT NO. : 4,155,040
DATED : May 15, 1979
INVENTOR(S) : James V. Harmon; Garreth J. Kavlie; Steven R. Ackerman It is certified that error appears in the above-identified patent and that said Letters Patent are hereby corrected as shown below:

Column 10, line 61, after "transceiver" insert --scan is---.
Column 12, line 3, delete "cpmmunications" insert --communications--.
Column 12, line 8, after "one" first occurrence, insert -- other --.
Column 12, line 50, delete "including" and substitute therefor --includes--.
Column 13, line 3, delete "storage" and substitute therefor --storing--.

Signed and Sealed this

Twenty-third Day of October 1979

[SEAL]

Attest:

RUTH C. MASON
Attesting Officer

LUTRELLE F. PARKER
Acting Commissioner of Patents and Trademarks